United States Patent
Kuniya (10) Patent No.: US 12,441,068 B2
(45) Date of Patent: Oct. 14, 2025

(54) FIBER WIDTH ADJUSTMENT DEVICE AND METHOD OF MOLDING COMPOSITE MATERIAL

(71) Applicant: SUBARU CORPORATION, Tokyo (JP)

(72) Inventor: Tomoyoshi Kuniya, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 217 days.

(21) Appl. No.: 18/482,393

(22) Filed: Oct. 6, 2023

(65) Prior Publication Data

US 2024/0140054 A1    May 2, 2024

(30) Foreign Application Priority Data

Nov. 1, 2022    (JP) .................................. 2022-175767

(51) Int. Cl.
B29C 70/54    (2006.01)

(52) U.S. Cl.
CPC .................................. B29C 70/543 (2013.01)

(58) Field of Classification Search
CPC .................................................. B29C 70/543
See application file for complete search history.

(56) References Cited

U.S. PATENT DOCUMENTS

| | | | | |
|---|---|---|---|---|
| 4,301,579 A * | 11/1981 | Van den Hoven | ... | B65H 51/005 |
| | | | | 28/282 |
| 11,260,609 B2 | 3/2022 | Yasukochi et al. | | |
| 11,548,241 B2 | 1/2023 | Yasukochi et al. | | |
| 2007/0023139 A1 * | 2/2007 | Bruyere | ................. | B29C 70/382 |
| | | | | 156/182 |
| 2015/0259832 A1 * | 9/2015 | Oosawa | ................... | D04H 1/70 |
| | | | | 28/282 |
| 2016/0153126 A1 | 6/2016 | Kang et al. | | |
| 2019/0063854 A1 | 2/2019 | Yoshida | | |

FOREIGN PATENT DOCUMENTS

| | | |
|---|---|---|
| CN | 106182823 A | 12/2016 |
| EP | 3666506 A1 * | 6/2020 |
| EP | 3 885 113 A1 | 9/2021 |
| JP | S57-043833 | 3/1982 |
| JP | 2002-019941 A | 1/2002 |
| JP | 2011-093276 A | 5/2011 |
| JP | 2019-046854 A | 3/2019 |
| JP | 2020-093454 A | 6/2020 |
| WO | WO-2011/116191 A1 * | 9/2011 |

OTHER PUBLICATIONS

Extended European Search Report mailed Apr. 10, 2024 for European Patent Application No. 23206533.4 (9 pages).

* cited by examiner

*Primary Examiner* — Jeffry H Aftergut (74) *Attorney, Agent, or Firm* — Smith, Gambrell & Russell, LLP (57) ABSTRACT

A fiber width adjustment device is for adjusting a width of a tape made of fibers before or after being impregnated with resin. The tape is a material for a fiber reinforced plastic. The fiber width adjustment device includes a pair of wall surfaces, a moving mechanism and rollers. The pair of the wall surfaces form a path for passing the tape. The path has a gradually decreasing width. The moving mechanism is configured to move the path relatively to the tape so that a position at which the tape leaves the path changes. The rollers are for feeding the tape in the path.

14 Claims, 10 Drawing Sheets

FIBER WIDTH ADJUSTMENT DEVICE AND METHOD OF MOLDING COMPOSITE MATERIAL

CROSS REFERENCES TO RELATED APPLICATIONS

This application is based upon and claims the benefit of priority from Japanese Patent Application No. 2022-175767, filed on Nov. 1, 2022; the entire contents of which are incorporated herein by reference.

FIELD

Implementations described herein relate generally to a fiber width adjustment device and a method of molding a composite material.

BACKGROUND

In order to mold an FRP (fiber reinforced plastic), such as a GFRP (glass fiber reinforced plastic) or a CFRP (carbon fiber reinforced plastic), which is also referred to as a composite material, it is necessary to laminate prepreg sheets consisting of fiber sheets impregnated with uncured resin, and subsequently cure the resin. Alternatively, it is necessary to laminate fiber sheets which have not been impregnated with resin, and subsequently impregnate the laminated fiber sheets with the resin and cure the resin. The method of molding an FRP of impregnating fibers with resin after laminating the fibers is referred to as an RTM (Resin Transfer Molding) method.

In recent years, an AFP (Automated Fiber Placement) apparatus for automatically laminating prepreg tapes or fiber tapes is commercially available, and therefore a prepreg tape as well as a fiber tape, which has not been impregnated with resin, called a dry tape is also commercially available for lamination with an AFP apparatus.

A laminate of fibers shaped to match a shape of an FRP to be molded is called a preform. Among preforms, a laminate of fibers before being impregnated with resin, which is produced in order to mold an FRP by the RTM method, is called a dry preform.

In order to mold an FRP having a more complicated shape, it is necessary to allow producing a preform having a corresponding complicated shape. That is, it is necessary to produce a preform in which prepreg tapes or dry tapes, which are material of an FRP, are laminated according to a shape of the FRP. Accordingly, there has been proposed a width adjustment device that changes a width of a prepreg tape or a dry tape by making the prepreg tape or the dry tape pass through a path whose width gradually decreases (for example, refer to international publication WO 2011/116191 A and Japanese Patent Application Publication JP 2020-093454 A).

An object of the present invention is to allow stably adjusting a width of a prepreg tape or a dry tape for FRP molding.

SUMMARY

In general, according to one implementation, a fiber width adjustment device is for adjusting a width of a tape made of fibers before or after being impregnated with resin. The tape is a material for a fiber reinforced plastic. The fiber width adjustment device includes a pair of wall surfaces, a moving mechanism and rollers. The pair of the wall surfaces form a path for passing the tape. The path has a gradually decreasing width. The moving mechanism is configured to move the path relatively to the tape so that a position at which the tape leaves the path changes. The rollers are for feeding the tape in the path.

Further, according to one implementation, a method of molding a composite material includes: adjusting the width of the tape using the above-mentioned fiber width adjustment device; laminating the tape of which the width has been adjusted; and producing the composite material consisting of the fiber reinforced plastic by curing the resin included in the laminated tape.

BRIEF DESCRIPTION OF THE DRAWINGS

In the accompanying drawings:

FIG. 14 explains an example of the position at which the pull-out roller shown in FIG. 1, FIG. 6A, FIG. 6B and FIG. 6C is disposed.

DETAILED DESCRIPTION

A fiber width adjustment device and a method of molding a composite material according to implementations of the present invention will be described with reference to the accompanying drawings.

(Structure and Function of Fiber Width Adjustment Device)

Figure 1:
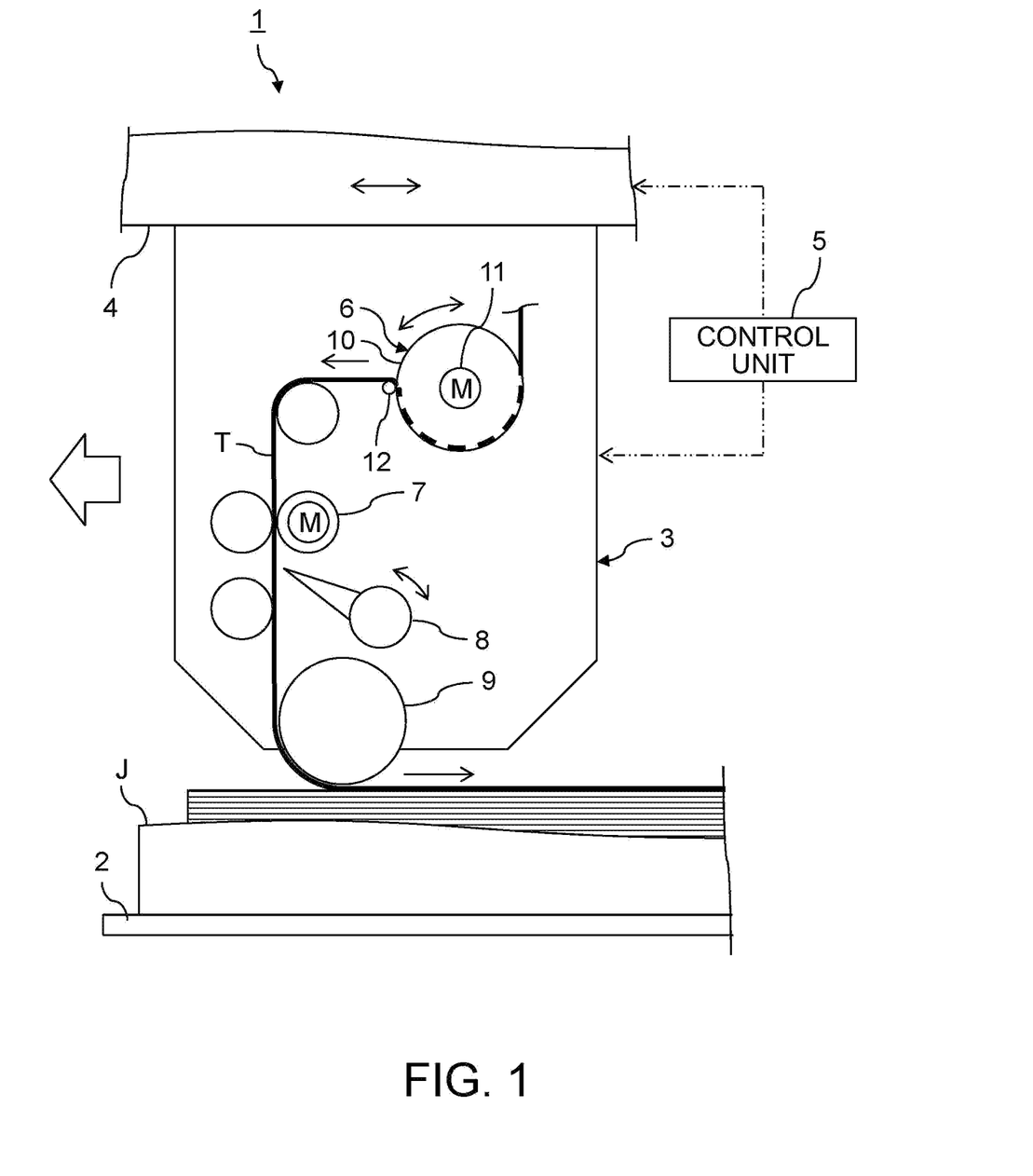
FIG. 1 shows an example of a configuration of an AFP apparatus having a fiber width adjustment device according to an implementation of the present invention.

FIG. 1 shows an example of a configuration of an AFP apparatus having a fiber width adjustment device according to an implementation of the present invention.

An AFP apparatus 1 produces a laminated body of prepreg tapes T, which are material of an FRP, by laminating the prepreg tapes T. Prepreg is sheet like fibers impregnated with thermoplastic resin or uncured thermosetting resin. The prepreg tape T is a tape-shaped prepreg. The AFP apparatus 1 can be composed of a table 2, a lamination head 3 for feeding the prepreg tape T toward the table 2, a feeding mechanism 4 and a control unit 5 which integrally controls elements of the AFP apparatus 1.

The table 2 is a pedestal for laminating the prepreg tapes T. Although the prepreg tapes T may be directly laminated on the table 2, it is practical to place a lamination jig J, such as a shaping mold, on the table 2 so that the prepreg tapes T may be laminated on the lamination jig J, from a viewpoint of shaping a laminated body of the prepregs and cleaning. Therefore, the prepreg tapes T can be laminated on the table 2 directly or indirectly through the lamination jig J.

The lamination head 3 can include a fiber width adjustment device 6 of the prepreg tape T as well as a feed roller 7, a cutter 8 and a compaction roller 9. The fiber width adjustment device 6 is a device for adjusting the width of the prepreg tape T supplied as a material from a bobbin or the like to feed out the prepreg tape T.

The feed roller 7 is a powered roller rotated by a motor. The feed roller 7 is provided to feed the prepreg tape T, of which the width has been adjusted by the fiber width adjustment device 6, toward the compaction roller 9. The motor of the feed roller 7 can be controlled by the control unit 5. Note that, a belt conveyor or a belt conveyor with a suction chuck disclosed in the application documents of Japanese Patent Application No. 2022-013771 may be used without the feed roller 7 or in addition to the feed roller 7.

The cutter 8 is a tool for cutting the prepreg tape T when the prepreg tape T has been laminated. The operation of the cutter 8 can be controlled by the control unit 5.

The compaction roller 9 is a cylindrical roller for feeding out the prepreg tape T toward the table 2 while applying pressure to the prepreg tape T in the thickness direction of the prepreg tape T. The prepreg tape T in the first ply is pressed on the lamination jig J by the compaction roller 9, and each prepreg tape T in the second and subsequent plies is pressed on the lower laminated prepreg tape T adjacent in the thickness direction.

The feeding mechanism 4 moves the lamination head 3 relative to the table 2 so that the prepreg tape T can be fed out toward the table 2 side while changing a lamination position. A feeding direction of the prepreg tape T toward the table 2 side is opposite to a moving direction of the lamination head 3. The feeding mechanism 4 may be configured to rotate the lamination head 3, in addition to linear movement of the lamination head 3 in orthogonal three-axis directions. In that case, the compaction roller 9 attached to the lamination head 3 may be rotated without rotating the housing itself of the lamination head 3. Similarly, the compaction roller 9 may be moved vertically relative to the lamination head 3 without moving the housing itself of the lamination head 3 vertically.

For example, the feeding mechanism 4 for linearly moving the lamination head 3 and/or the table 2 can be composed of at least one motor, such as an electric motor, a hydraulic motor or a pneumatic motor, circuitry, such as electric circuitry, hydraulic circuitry or pneumatic circuitry, for rotating the at least one motor, and at least one desired machine element, such as wheels, a rack-and-pinion which is one kind of gears, at least one ball screw, or at least one crawler, for converting rotational movement of the at least one motor into linear movement. Alternatively, the feeding mechanism 4 may also be composed of at least one piston and hydraulic circuitry without using any motor.

When the feeding mechanism 4 includes a rotation mechanism for rotating the lamination head 3, the rotation mechanism can be composed of, e.g., at least one motor, such as an electric motor, a hydraulic motor or a pneumatic motor, and desired machine elements including a rotating shaft which rotates by power of the at least one motor. An articulated robot may be used as the mechanism for rotating the lamination head 3. When the lamination head 3 is attached as an end effector to an arm of an articulated robot, the lamination head 3 is also rotated and linearly moved by a link mechanism or the like including a shaft rotated by at least one motor.

After the end of the prepreg tape T reach the compaction roller 9, the prepreg tape T can be fed out by the pressure applied from the compaction roller 9 even without applying tension to the prepreg tape T by the powered feed roller 7 as long as the lamination head 3 is relatively moved by the feeding mechanism 4. Accordingly, the feed roller 7 may be made retractable from the prepreg tape T by a cylinder mechanism or the like. Conversely, in order to secure the tension of the prepreg tape T appropriately, the feed roller 7 may be brought into contact with the prepreg tape T and the prepreg tape T may be slid on the feed roller 7.

Next, an example of a detailed structure of the fiber width adjustment device 6 will be described.

The fiber width adjustment device 6 can be composed of a main body 10, a moving mechanism 11 and a pull-out roller 12 as shown in FIG. 1. The main body 10 is a mechanism for adjusting the width of the prepreg tape T. The moving mechanism 11 is a device for moving the main body 10. In the example shown in FIG. 1, the main body 10 has a cylindrical appearance, and the cylindrical main body 10 can be rotated in the circumferential direction by the moving mechanism 11 having a motor. The pull-out roller 12 is a roller for pulling out the prepreg tape T from the main body 10 and then feeding the prepreg tape T out to the feed roller 7 and the compaction roller 9 in the subsequent stages.

Figure 2:
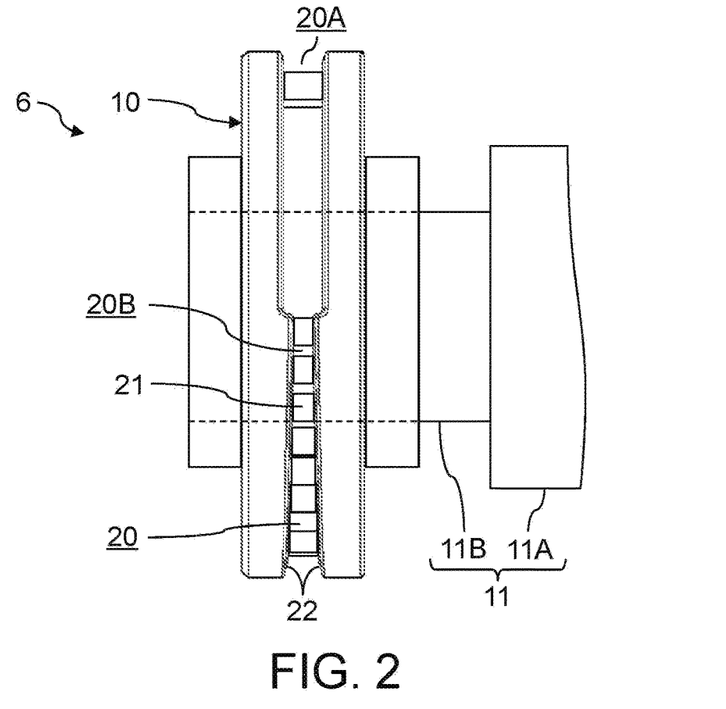
FIG. 2 is a front view showing an example of structures of the main body and the moving mechanism of the fiber width adjustment device shown in FIG. 1.
Figure 3:
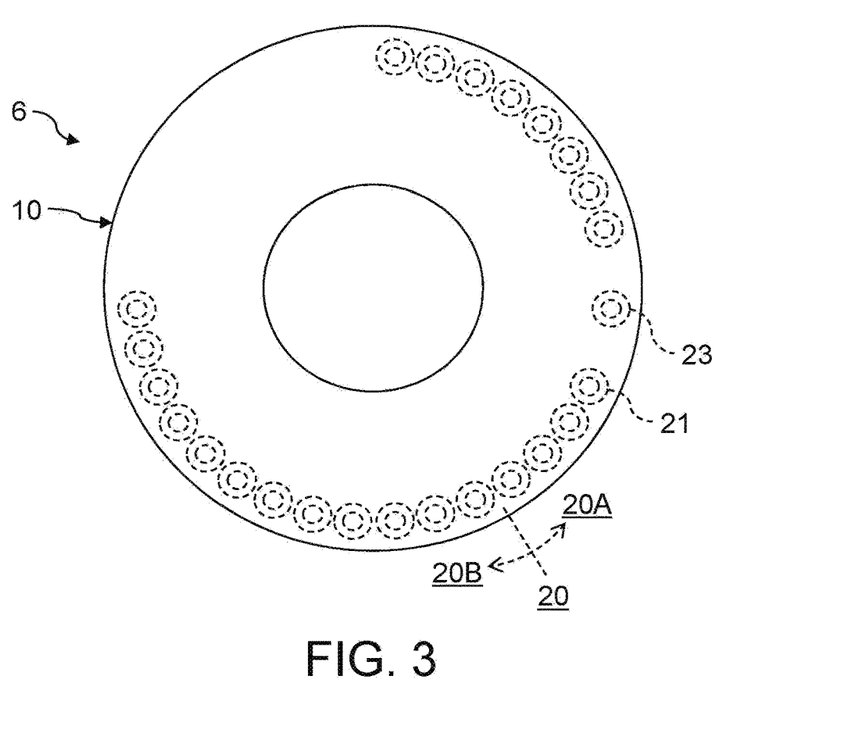
FIG. 3 is a right side view of the main body shown in FIG. 2.
Figure 4:
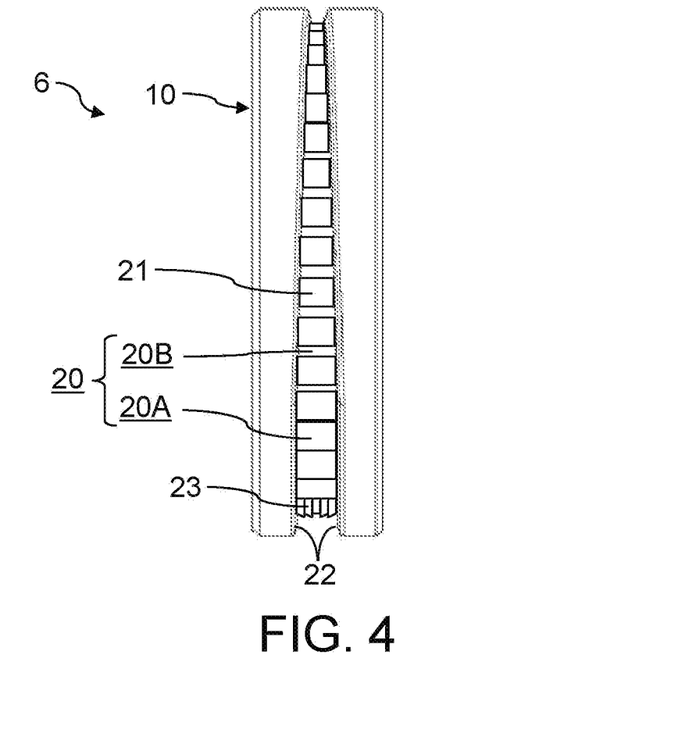
FIG. 4 is a bottom view of the main body shown in FIG. 2.
Figure 5:
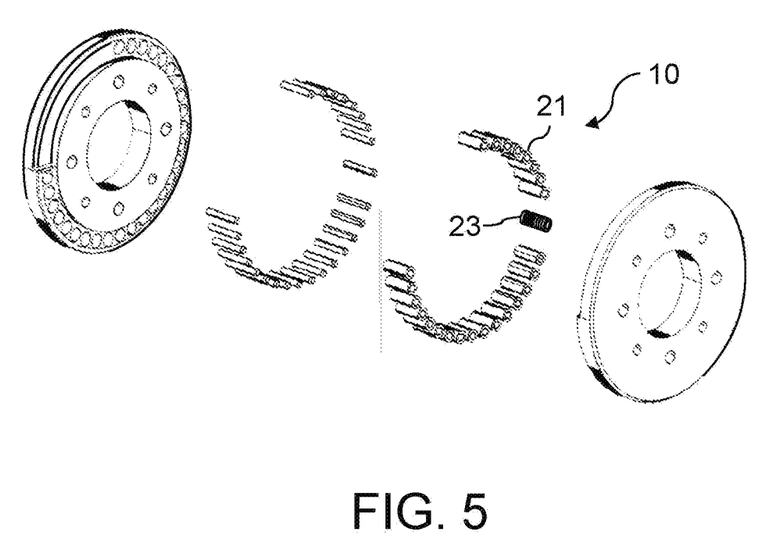
FIG. 5 is an exploded perspective view of the main body shown in FIG. 2.

FIG. 2 is a front view showing an example of structures of the main body 10 and the moving mechanism 11 of the fiber width adjustment device 6 shown in FIG. 1. FIG. 3 is a right side view of the main body 10 shown in FIG. 2. FIG. 4 is a bottom view of the main body 10 shown in FIG. 2. FIG. 5 is an exploded perspective view of the main body 10 shown in FIG. 2.

The main body 10 of the fiber width adjustment device 6 has a path 20 for passing the prepreg tape T, and rollers 21 for feeding out the prepreg tape T in the path 20. The path 20 is formed by a pair of wall surfaces 22 and the rollers 21. The path 20 has a constant width section 20A and a tapered width section 20B. The constant width section 20A is disposed on the entrance side of the path 20 and has a constant width. Meanwhile, the tapered width section 20B is disposed on the exit side of the path 20 and has a gradually decreasing width.

More specifically, each of the rollers 21 is a cylindrical roller that rotates freely around a rotating shaft without power like a cylindrical skid as shown in FIG. 5. The rollers 21 are disposed along an arc so that the rotation axes of the rollers 21 may be parallel to each other. In the illustrated example, two annular plates are disposed to face each other with the rollers 21 interposed between the annular plates, and surfaces near the outer edges of the annular plates form the wall surfaces 22 of the path 20. Further, the rollers 21 are disposed along the arc having the same center as that of each annular plate and a diameter smaller than the outer diameter of each annular plate.

Therefore, the path 20 of the prepreg tape T does not have a continuous bottom surface, and the bottom of the path 20 is formed by the rotatable curved surfaces of the rollers 21. A gap is formed between each adjacent rollers 21 to avoid interference between each adjacent rollers 21. Accordingly, the bottom of the path 20 is discontinuous and intermittent. That is, the path 20 of the main body 10 has a structure in which the bottom surface of a groove is replaced with the rollers 21.

On the other hand, the moving mechanism 11 can be composed of a motor 11A and a rotating shaft 11B. One end of the rotating shaft 11B is inserted into the center of the cylindrical main body 10 and then fixed to the main body 10. The other end of the rotating shaft 11B is coupled to the output shaft of the motor 11A. Accordingly, the main body 10 can be rotated by the power from the motor 11A. In addition, the rotation angle of the main body 10 can be controlled by controlling the rotation amount of the output shaft of the motor 11A with the control unit 5.

Although the output shaft of the motor 11A is integrated with the rotating shaft 11B in the example shown in FIG. 2, the torque of the motor 11A may be transmitted to the rotating shaft 11B through desired mechanical elements, such as gears or a belt moved with pulleys. For example, a lever may be fixed to the rotating shaft 11B, and an end portion of the lever may be reciprocated by an electric actuator driven by a motor in order to rotate the rotating shaft 11B.

Figure 6A:
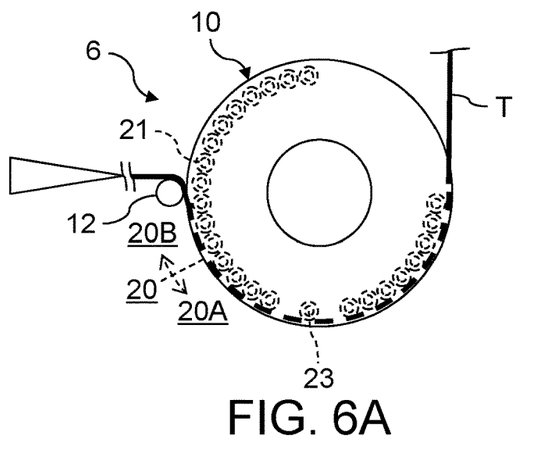
FIG. 6A, FIG. 6B and FIG. 6C explain a method of changing the width of the prepreg tape with the fiber width adjustment device shown in FIG. 1.
Figure 6B:
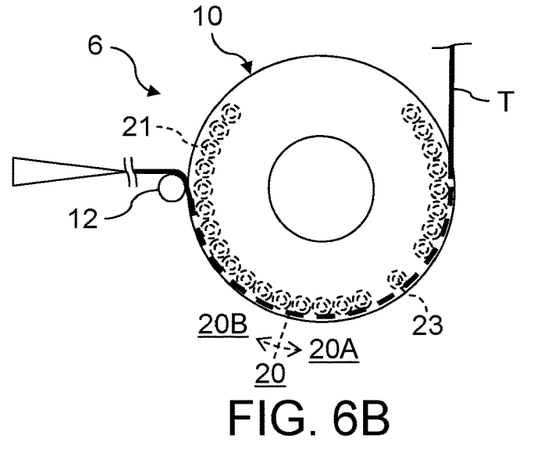
Figure 6C:
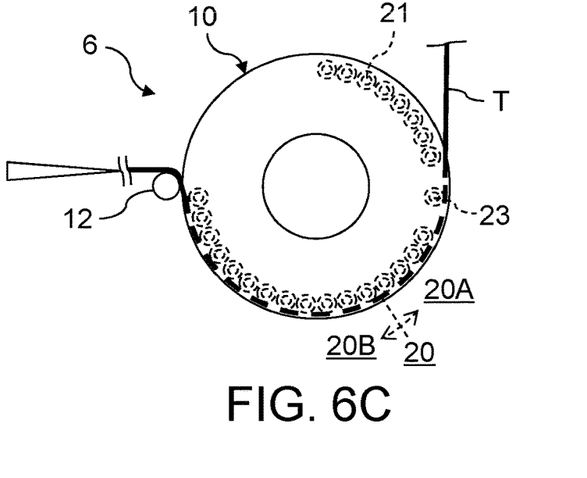

FIG. 6A, FIG. 6B and FIG. 6C explain a method of changing the width of the prepreg tape T with the fiber width adjustment device 6 shown in FIG. 1.

FIG. 6A, FIG. 6B and FIG. 6C respectively show states in which the prepreg tape T is passed through the path 20 formed in the main body 10 of the fiber width adjustment device 6, and then the main body 10 is rotated at different rotation angles by the moving mechanism 11. The prepreg tape T can be pulled into the constant width section 20A of the main body 10 from a fixed position. On the other hand, the prepreg tape T can be pulled out from the tapered width section 20B by the pull-out roller 12 disposed at another fixed position.

As shown in FIG. 4, the width of the constant width section 20A is the maximum width of the tapered width section 20B. That is, the width of the path 20 gradually narrows from a certain position. The width of the constant width section 20A is matched with the width of the prepreg tape T whose width has not been adjusted. On the other hand, the width of the tapered width section 20B is determined so as to cover a possible width of the prepreg tape T whose width has been adjusted.

Therefore, when the main body 10 is rotated by the moving mechanism 11 with respect to the pull-out roller 12 disposed at the fixed position as shown in FIG. 6A, FIG. 6B and FIG. 6C, the position at which the prepreg tape T leaves the tapered width section 20B can be changed since the path 20 including the tapered width section 20B rotates with respect to the position at which the prepreg tape T is pulled out by the pull-out roller 12.

As a result, the width of the prepreg tape T can be narrowed to a width corresponding to the width of the tapered width section 20B at a position where the prepreg tape T leaves the tapered width section 20B. That is, the width of the prepreg tape T can be variably adjusted by narrowing the width of the prepreg tape T by passing the prepreg tape T through the tapered width section 20B of the path 20 whose width gradually narrows, and changing the position at which the prepreg tape T leaves the tapered width section 20B.

More specifically, when the prepreg tape T is pulled out from the path 20 at a position which is not affected by the tapered width section 20B as shown in FIG. 6A, the prepreg tape T can be fed out from the pull-out roller 12 without changing the width of the prepreg tape T supplied to the fiber width adjustment device 6 as a material. On the other hand, when the main body 10 is rotated and the prepreg tape T is pulled out from the path 20 at a position which is affected by the tapered width section 20B as shown in FIG. 6B, the prepreg tape T can be fed out from the pull-out roller 12 with narrowing the width of the prepreg tape T supplied to the fiber width adjustment device 6 as a material. Alternatively, when the main body 10 is further rotated and the prepreg tape T is pulled out from the path 20 at a narrower position of the tapered width section 20B as shown in FIG. 6C, the prepreg tape T can be fed out from the pull-out roller 12 with further narrowing the width of the prepreg tape T.

The width of the prepreg tape T for an aircraft is standardized in units of inches in many cases. It was confirmed by preform prototype tests that it was desirable to make the width of the prepreg tape T not more than ¼ inch (6.35 mm) from the viewpoint of securing the quality of a preform produced as a laminated body of the prepreg tapes T when steering lamination was performed in which the lamination head 3 of the AFP apparatus 1 was rotated along a curved line to feed the prepreg tape T onto the table 2.

Accordingly, when the prepreg tape T having a width of ¼ inch is used, the width of the constant width section 20A can be 6.35 mm. In this case, when the narrowest width of the tapered width section 20B is set to not more than 3.175 mm, the prepreg tape T having a width of ⅛ inch can be produced using the prepreg tape T having a width of ¼ inch as a material.

The length of each roller 21 can be determined according to the width of path 20. On the other hand, the smaller the diameter and the interval of the rollers 21 are, the easier it is to change the width of the prepreg tape T continuously. This is because the path 20 of the prepreg tape T approaches an arc as the diameter and the interval of the rollers 21 decrease. That is, the path 20 of the prepreg tape T can be made more similar to a path if a bottom surface were formed, as the diameter and the interval of the rollers 21 are made small.

Accordingly, it is desirable to dispose the rollers 21, each having a small diameter that can ensure mechanical strength, at small intervals. Note that, the fiber width adjustment device 6 having the rollers 21 whose diameters are each about 4 mm to 5 mm was actually produced as a trial, and it was confirmed that the width of the prepreg tape T could be stably changed.

When the rollers 21 are disposed without forming a bottom surface in the path 20 for passing the prepreg tape T as in the fiber width adjustment device 6 shown in FIG. 2 to FIGS. 6A, 6B and 6C, the prepreg tape T is not brought into surface contact with the path 20, but is brought into line contact with the path 20. In addition, since each roller 21 rotates, it is not necessary to slide the prepreg tape T on each roller 21.

As a result, it is possible to avoid the problem that the prepreg tape T sticks to a surface in the path 20 due to tackiness and thereby cannot be fed out. In addition, the feeding speed of the prepreg tape T can be easily changed. That is, it is possible to prevent the feeding speed of the prepreg tape T from being reduced below a target speed due to friction. Accordingly, it is possible to change the feeding speed appropriately when steering lamination is performed. In addition, the prepreg tape T can be pressed against each roller 21 in the thickness direction with sufficient pressure. Thereby, the width of the prepreg tape T can be stably changed according to an interval between the wall surfaces 22.

Note that, the rollers 21 may be disposed in a desired array method as long as the prepreg tape T can be passed through the path 20 while keeping the tension of the prepreg tape T although FIG. 2 to FIG. 5 show an example of the fiber width adjustment device 6 having the rollers 21 disposed along an arc. For example, the rollers 21 may be disposed along a part of a desired curve, such as an ellipse or a parabola, or at positions of vertices of a polygon. In other words, the main body 10 of the fiber width adjustment device 6 may have the path 20 that does not curve along an arc in the thickness direction of the prepreg tape T. When the rollers 21 are disposed at positions of vertices of a polygon, the width of the prepreg tape T may be changed stepwise to discrete widths. When the rollers 21 are arrayed along an arc as exemplified in FIG. 2 to FIGS. 6A, 6B and 6C, the fiber width adjustment device 6 by which the width of the prepreg tape T can be changed to a desired width can be easily designed and produced.

In order to change the position where the prepreg tape T leaves the tapered width section 20B, the moving mechanism 11 may not only rotate the main body 10 of the fiber width adjustment device 6 but also move the main body 10 in parallel. In addition, the position of another roller that supports the prepreg tape T may be moved relative to the main body 10. That is, the moving mechanism 11 can move the path 20 of the prepreg tape T relative to the prepreg tape T in at least one desired axis direction so that the position at which the prepreg tape T leaves the tapered width section 20B may change. Therefore, it is practical to compose the moving mechanism 11 of the motor 11A, such as an electric motor, which can accurately control the amount of rotation, and the rotating shaft 11B rotated by the motor 11A, or to compose the moving mechanism 11 of an electric actuator driven in at least one desired axis direction by an electric motor.

When the constant width section 20A whose length is longer than a moving distance of the tapered width section 20B is formed on the entrance side of the path 20 of the prepreg tape T, it is possible to draw the prepreg tape T before width adjustment into the path 20 at a desired position in the constant width section 20A. That is, when the path 20 of the prepreg tape T is moved together with the main body 10 in a case where the path 20 consists of only the tapered width section 20B having a changing width, it is necessary to move the position, at which the prepreg tape T is drawn into the path 20, according to a width of the tapered width section 20B, or to draw the prepreg tape T into the path 20 from a position of the tapered width section 20B having a width different from that of the prepreg tape T.

In contrast, not only forming the constant width section 20A whose width is matched to the width of the prepreg tape T before width adjustment, in front of the tapered width section 20B, but also disposing the rollers 21 for feeding out the prepreg tape T also in the constant width section 20A allow drawing the prepreg tape T into the path 20 from a different position of the constant width section 20A while drawing the prepreg tape T into the path 20 at a fixed position.

Accordingly, in case of the example shown in FIG. 2 to FIGS. 6A, 6B and 6C, the prepreg tape T can be pulled into the path 20 to vary the width of the prepreg tape T only by rotating the main body 10, forming the path 20 of the prepreg tape T, as a rotating body by the moving mechanism 11. That is, it is not necessary to rotate the prepreg tape T in order to move the position, at which the prepreg tape T is pulled into the path 20, and the position, at which the prepreg tape T is pulled out from the path 20, with respect to the lamination head 3. As a result, the moving mechanism 11 can have a simple structure composed of the motor 11A and the rotating shaft 11B.

In front of the tapered width section 20B, it is desirable to dispose a roller 23 whose surface is at least partially jagged in the rotation axis direction, as shown in FIG. 3 to FIGS. 6A, 6B and 6C. In this case, the roller 23 having the jagged surface is disposed at a position in the constant width section 20A through which the prepreg tape T always passes even when the path 20 is moved together with the main body 10.

Figure 7:
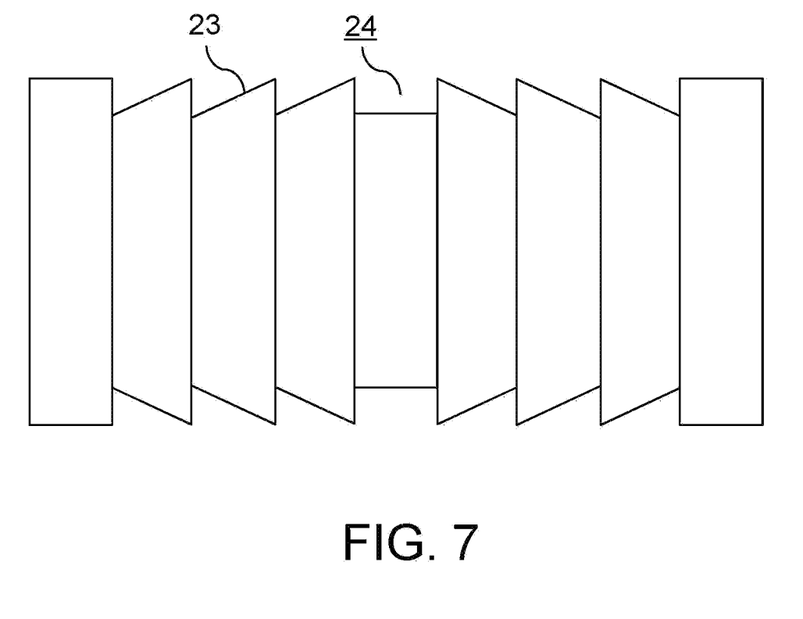
FIG. 7 is a front view showing an example of the shape of the roller disposed in front of the tapered width section shown in FIG. 2 to FIG. 4.
Figure 8:
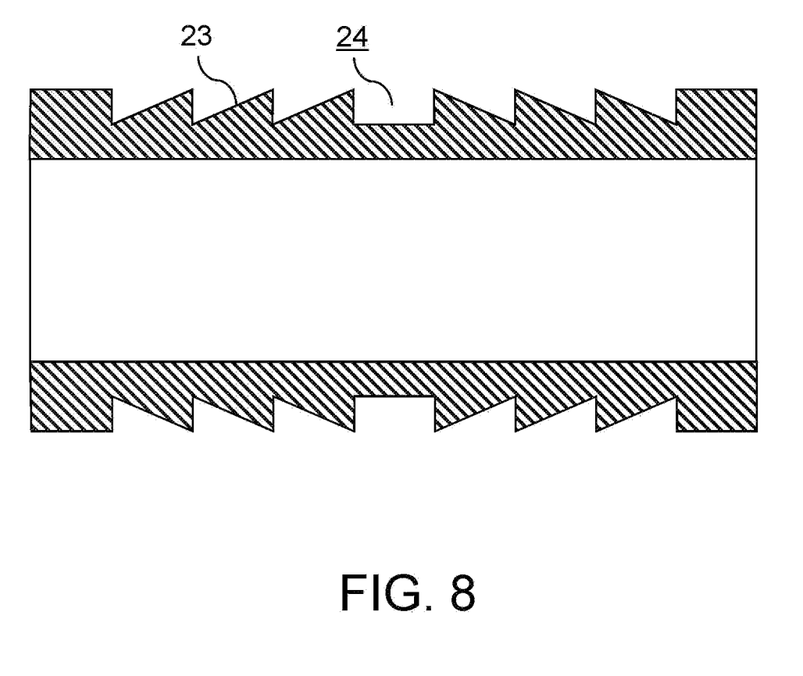
FIG. 8 is a longitudinal sectional view of the roller shown in FIG. 7.
Figure 9:
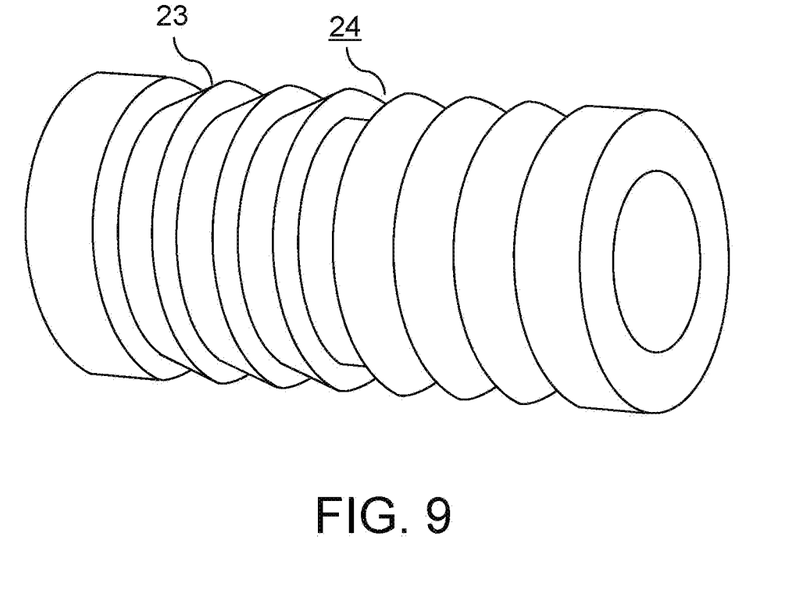
FIG. 9 is a perspective view of the roller shown in FIG. 7.

FIG. 7 is a front view showing an example of the shape of the roller 23 disposed in front of the tapered width section 20B shown in FIG. 2 to FIG. 4. FIG. 8 is a longitudinal sectional view of the roller 23 shown in FIG. 7. FIG. 9 is a perspective view of the roller 23 shown in FIG. 7.

It is desirable to dispose the roller 23 whose surface is jagged in the rotation axis direction on the longitudinal section as shown in FIG. 7 to FIG. 9, before the tapered width section 20B. It is appropriate to form the jagged surface by making at least a portion of the surface of the roller 23 have a shape in which side surfaces of circular truncated cones are coupled in series so that each diameter may increase toward the center in the rotation axis direction. In addition, it is also appropriate to form an annular groove 24 at the center of the roller 23 in the rotation axis direction.

Disposing the above-mentioned rollers 23, having the tapered portions and the recessed center, in front of the tapered width section 20B allows avoiding the problem that the thickness of the prepreg tape T whose width has been adjusted becomes non-uniform. That is, the prepreg tape T whose width has been adjusted can have a uniform thickness.

Figure 10:
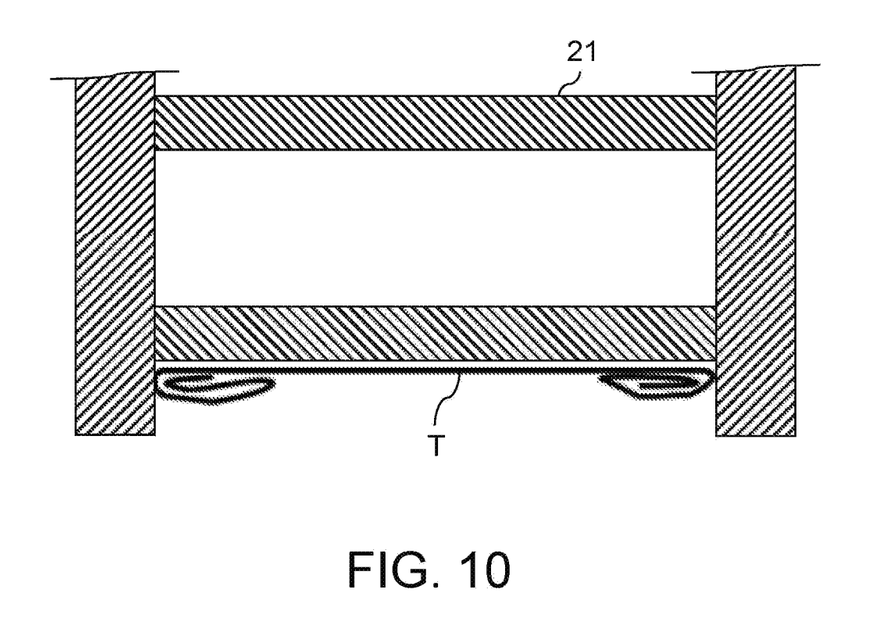
FIG. 10 explains a problem that arises when the roller whose surface is jagged is not placed before the tapered width section shown in FIG. 2 to FIG. 4.

FIG. 10 explains a problem that arises when the roller 23 whose surface is jagged is not placed before the tapered width section 20B shown in FIG. 2 to FIG. 4.

When the roller 23, having the jagged unevenness, whose diameter intermittently increasing toward the center is not disposed in front of the tapered width section 20B, the prepreg tape T is fed out only by the rollers 21 each having the flat surface on the longitudinal section as shown in FIG. 10. In this case, although the width of the prepreg tape T changes as long as the prepreg tape T passes through the tapered width section 20B, both ends of the prepreg tape T contacting the wall surfaces 22 of the tapered width section 20B may be turned up, and thereby only the end portions of the prepreg tape T may become thicker on the cross section of the prepreg tape T. That is, the thickness of the prepreg tape T may become extremely non-uniform between each end portion and the central portion.

Figure 11:
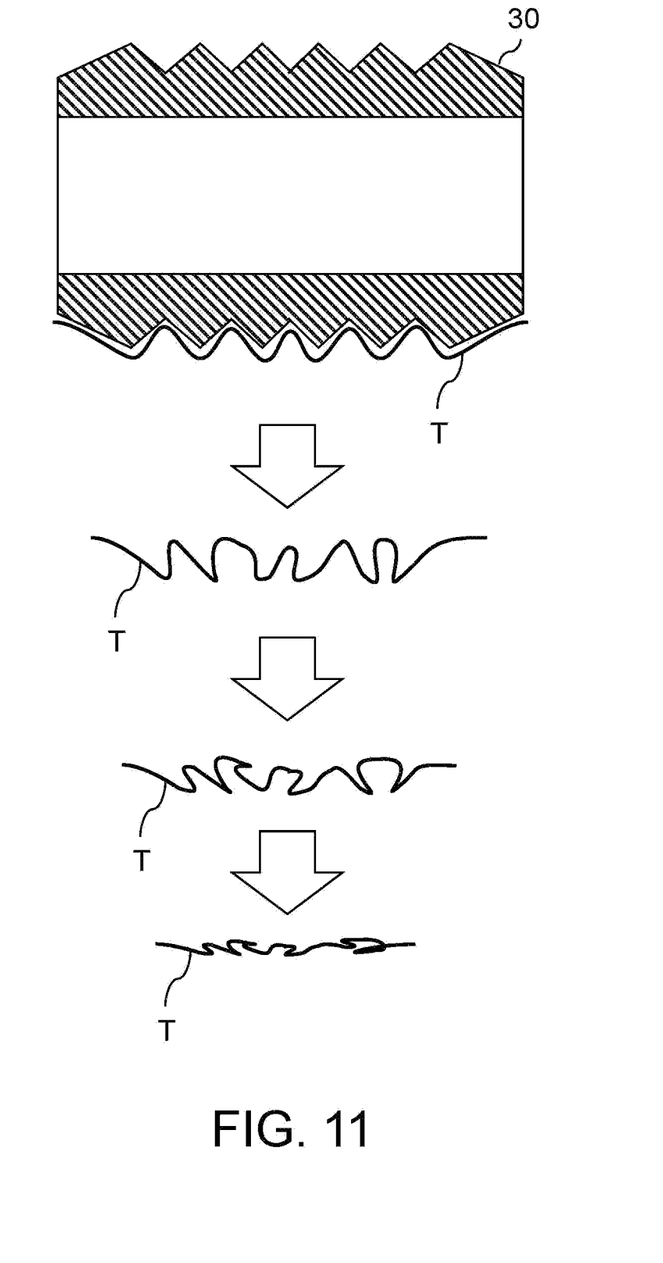
FIG. 11 explains a problem that arises when a roller having the shape of a comparative example 1 is placed before the tapered width section shown in FIG. 2 to FIG. 4.

FIG. 11 explains a problem that arises when a roller 30 having the shape of a comparative example 1 is placed before the tapered width section 20B shown in FIG. 2 to FIG. 4.

When the roller 30, having a simple jagged shape as shown in FIG. 11, whose surface is jagged but whose diameter increases and decreases in the rotation axis direction is disposed in front of the tapered width section 20B, the jagged roller 30 can cause the prepreg tape T to wrinkle at portions other than both ends. Accordingly, the width of the prepreg tape T can be reduced in the tapered width section 20B while folding the portions of the prepreg tape T other than both ends.

However, the directions in which the prepreg tape T is folded become irregular. Specifically, portions folded toward the center of the prepreg tape T and portions folded toward one end of the prepreg tape T are generated on the cross section of the prepreg tape T. Accordingly, the thickness of the prepreg tape T whose width has been adjusted may still become non-uniform.

Figure 12:
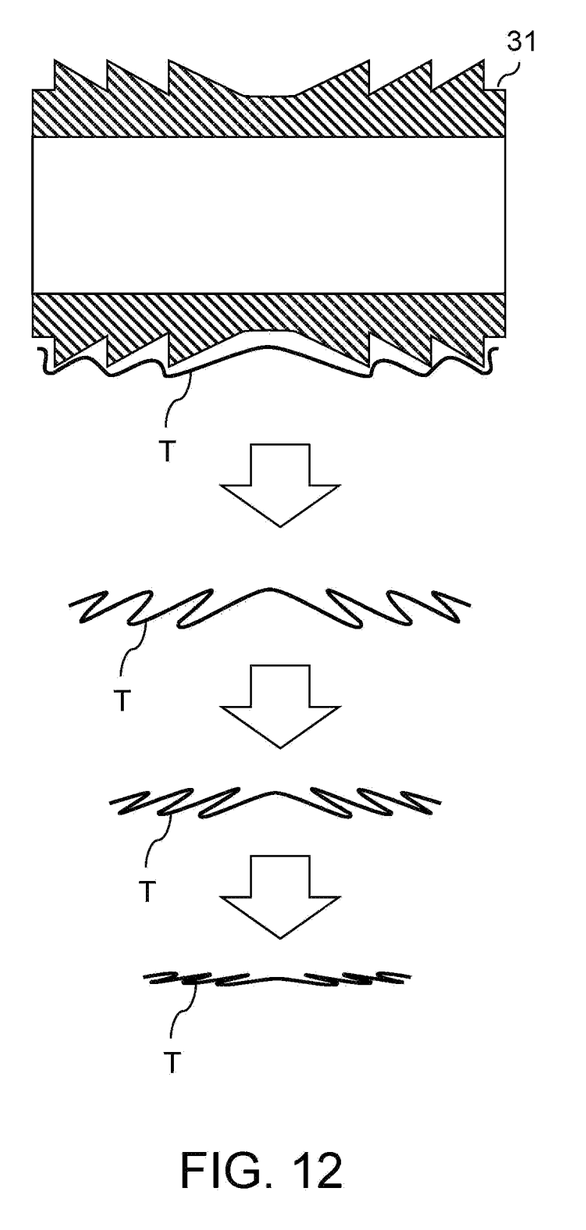
FIG. 12 explains a problem that arises when a roller having the shape of a comparative example 2 is placed before the tapered width section shown in FIG. 2 to FIG. 4.

FIG. 12 explains a problem that arises when a roller 31 having the shape of a comparative example 2 is placed before the tapered width section 20B shown in FIG. 2 to FIG. 4.

When the roller 31, having a jagged surface as shown in FIG. 12, whose diameter increases toward both ends in the rotation axis direction is disposed in front of the tapered width section 20B, respective crests of the roller 31 can cause the prepreg tape T to wrinkle at portions other than both ends. Accordingly, the width of the prepreg tape T can be reduced in the tapered width section 20B while folding the portions other than both ends starting from the wrinkles of the prepreg tape T.

However, the directions in which the prepreg tape T is folded become the directions toward both ends of the prepreg tape T. As a result, a problem that only the central portion of the prepreg tape T becomes thin on the cross section of the prepreg tape T arises.

Figure 13:
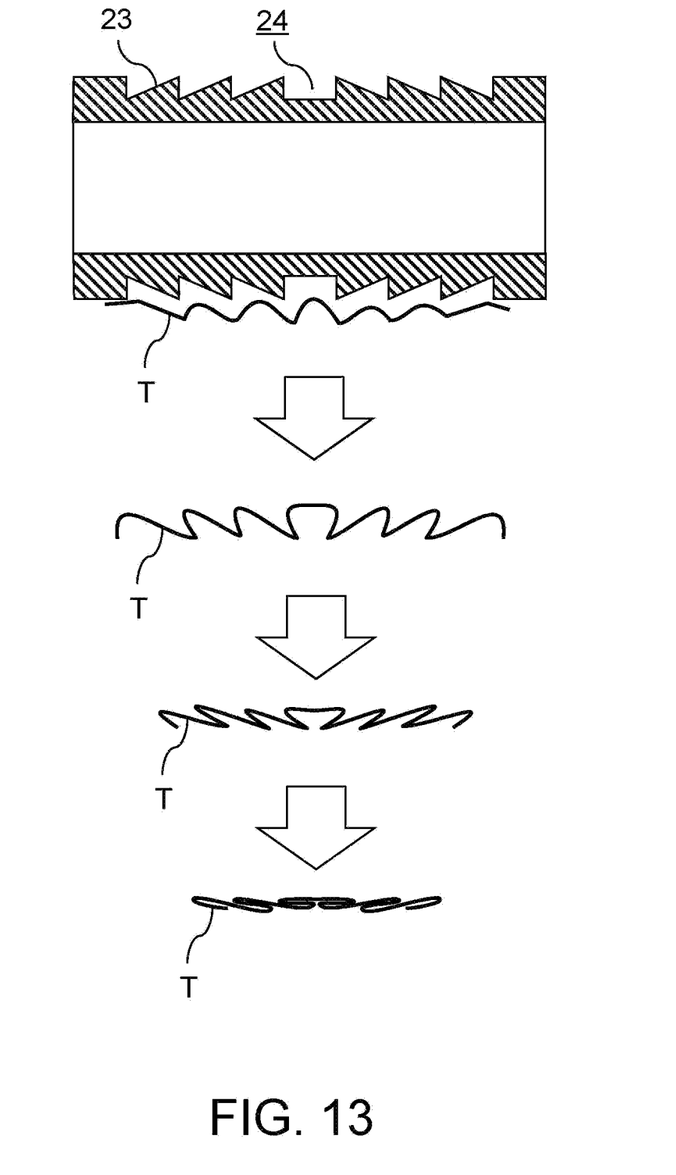
FIG. 13 explains effects when the roller whose surface is jagged in an appropriate orientation on the longitudinal section is placed before the tapered width section shown in FIG. 2 to FIG. 4.

FIG. 13 explains effects when the roller 23 whose surface is jagged in an appropriate orientation on the longitudinal section is placed before the tapered width section 20B shown in FIG. 2 to FIG. 4.

When the roller 23 having not only the surface jagged so that the diameter may increase toward the center in the rotation axis direction, but also the annular groove 24 with no jag at the center as shown in FIG. 13 is disposed in front of the tapered width section 20B, respective crests of the roller 23 can cause the prepreg tape T to wrinkle at portions other than both ends. Accordingly, the width of the prepreg tape T can be reduced in the tapered width section 20B while folding the portions other than both ends starting from the wrinkles of the prepreg tape T.

Specifically, when the prepreg tape T is fed out while being pressed by the roller 23 having the jagged surface, differences in the tension of the prepreg tape T arise in the width direction since the circumferential lengths of the roller 23 are different between the peaks and the valleys. When the differences in the tension arise in the prepreg tape T, the fibers naturally tend to move in directions in which the differences in the tension decrease. Specifically, an effect that the respective portions of the prepreg tape T passing through the valleys of the roller 23 advance toward the peaks having increased radii arises similarly to an effect that the prepreg tape T wrapped around the side surface of a circular cone advances in the direction in which the radius of the circular cone increases on the cross section of the circular cone.

The respective peaks of the roller 23 shown in FIG. 13 are uniformly slanted toward the center of the roller 23. Therefore, the respective peaks of the prepreg tape T are folded from the peak positions in the width direction toward the center. That is, a plurality of crease starting points can be created with the jagged rollers 23 in order to narrow the width of the prepreg tape T, and thereby the prepreg tape T can be narrowed in width while being folded toward the center at the plurality of the positions.

In addition, the center portion of the roller 23 shown in FIG. 13 does not have jagged peaks but has the annular groove 24. Accordingly, no creases are generated in the prepreg tape T by the center portion of the roller 23, and therefore the peaks of the prepreg tape T generated by the jagged peaks closest to the center portion of the roller 23 can be folded into the center portion of the prepreg tape T. That is, forming no jagged peaks in the center portion of the roller 23 allows securing a space, for folding the peaks of the prepreg tape T, at the center portion of the prepreg tape T.

As a result, the thickness of the prepreg tape T whose width has been adjusted can be made uniform. That is, the prepreg tape T can be folded in the width direction so that the thickness may become uniform on the cross section.

Note that, it is important to bring the roller 23, having the jagged surface, into contact with the prepreg tape T so that the prepreg tape T can be sufficiently creased whereas it is preferable to reduce the contact area between the prepreg tape T and each roller 21 for feeding out the prepreg tape T in the path 20 to the extent that the contact between the prepreg tape T and each roller 21 can be regarded as a line contact, from the viewpoint of preventing the prepreg tape T from sticking to each roller 21.

Accordingly, the interval between the roller 23, having the jagged surface, and each of the two rollers 21 in front and behind the roller 23, for feeding out the prepreg tape T, can be made wider than the interval between each adjacent other rollers 21, for feeding the prepreg tape T so that the roller 23 having the jagged surface may contact with the prepreg tape T with a sufficient contact area. In other words, the roller 23 having the jagged surface need not be densely disposed unlike the rollers 21 for feeding the prepreg tape T.

Although forming wrinkles whose length directions are each the length direction of the prepreg tape T, with the roller 23 having the jagged surface, allows feeding out the prepreg tape T folded in the width direction in the tapered width section 20B, it was confirmed that the width of the prepreg tape T which had once shrunk might return to its original width when the prepreg tape T was pulled out from the tapered width section 20B, as it was, in the direction in which the tension was acting.

Accordingly, the prepreg tape T can be pulled out from the tapered width section 20B while applying pressure in the thickness direction to the prepreg tape T whose width has shrunk, by the pull-out roller 12 as shown in FIG. 1, FIG. 6A, FIG. 6B and FIG. 6C. In order to apply sufficient pressure to the prepreg tape T by the pull-out roller 12, the feeding direction of the prepreg tape T which has left the tapered width section 20B should be sufficiently changed by the pull-out roller 12.

Figure 14:
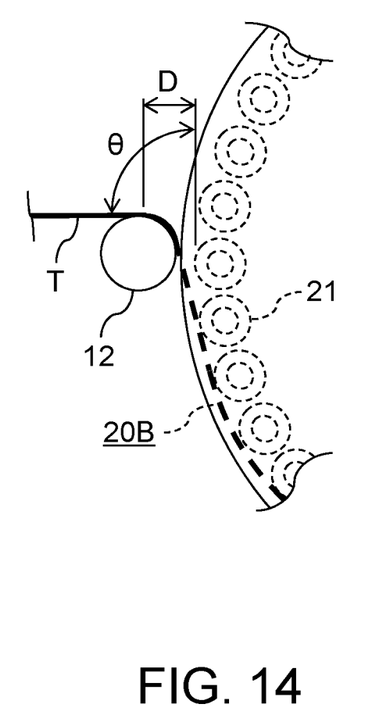

FIG. 14 explains an example of the position at which the pull-out roller 12 shown in FIG. 1, FIG. 6A, FIG. 6B and FIG. 6C is disposed.

As shown in FIG. 14, the prepreg tape T which has left the tapered width section 20B can be fed out by the pull-out roller 12 so that the angle θ between the feeding direction of the prepreg tape T which has left the tapered width section 20B and the feeding direction of the prepreg tape T by the roller 21 which has been moved to a position closest to the pull-out roller 12 may become not less than 45 degrees and not more than 180 degrees, preferably 90 degrees±5 degrees.

When the feeding direction of the prepreg tape T drawn from the tapered width section 20B is changed by the pull-out roller 12, the prepreg tape T is bent in the thickness direction, and thereby pressed to the pull-out roller 12 with sufficient pressure in the thickness direction by the tension of the prepreg tape T. As a result, the width of the prepreg tape T, which has been folded in the width direction and thereby reduced in width as shown in FIG. 13, can be fixed by pressing the creases of the prepreg tape T to adhere. That is, the width of the prepreg tape T is prevented from returning to its original width, and thereby the width of the prepreg tape T can be stably changed.

It is appropriate to position the pull-out roller 12 at the varying exit of the tapered width section 20B so that the pull-out roller 12 can apply pressure to the prepreg tape T before the width of the prepreg tape T returns to its original width. That is, it is appropriate to dispose the pull-out roller 12 at the position where the prepreg tape T leaves the tapered width section 20B.

Accordingly, the pull-out roller 12 was disposed so that the distance D between the rotation center of the pull-out roller 12 having a radius of 5 mm and the surface of the roller 21 moved to the position closest to the pull-out roller 12 might become not more than 10 mm as shown in FIG. 14. As a result, it was confirmed that the effect that the width of the prepreg tape T could be prevented from returning to its original width was sufficiently achieved.

(Method of Molding Composite Material)

Next, a method of molding a composite material using the AFP apparatus 1 having the fiber width adjustment device 6 will be described.

In order to mold an FRP, a preform having a shape corresponding to a shape of the FRP after molding is first produced by laminating and shaping prepreg tapes T. For that purpose, the lamination jig J, having a simple shape, for laminating the prepreg tapes T as well as a shaping jig, having a complicated shape, for shaping a laminated body of the prepreg tapes T may be prepared separately. In this case, the laminated body of the prepreg tapes T laminated on the lamination jig J is transferred on the shaping jig and then shaped. Alternatively, the lamination jig J itself may be also used as the shaping jig.

The operation of laminating the prepreg tapes T on the lamination jig J is performed by the AFP apparatus 1 exemplified in FIG. 1. For that purpose, a bobbin wound with the prepreg tape T is set on a creel stand disposed inside the lamination head 3 or at a predetermined position outside the lamination head 3. At this time, an end portion of the prepreg tape T is sandwiched between the feed roller 7 and its support roller. When the AFP apparatus 1 is operated under the control of the control unit 5, the feed roller 7 rotates. Thereby, the end portion of the prepreg tape T is fed out.

When the end portion of the prepreg tape T reaches the surface of the lamination jig J, the feeding mechanism 4 is driven under the integrated control by the control unit 5, and thereby the lamination head 3 is moved in the direction opposite to a feeding direction of the prepreg tape T. As a result, the compaction roller 9 is moved relatively to the lamination jig J in the direction opposite to the feeding direction of the prepreg tape T, and eventually the end portion of the prepreg tape T is sandwiched between the compaction roller 9 and the lamination jig J. That is, the end portion of the prepreg tape T reaches the compaction roller 9.

Accordingly, when the lamination head 3 is continuously moved in the direction opposite to the feeding direction of the prepreg tape T, the prepreg tape T is fed in the feeding direction. The feeding speed of the prepreg tape T becomes a speed of the prepreg tape T being fed out while receiving pressure from the compaction roller 9, i.e., a relative speed of the table 2 and the lamination jig J to the compaction roller 9 and the lamination head 3.

After that, the prepreg tapes T can be laminated on the lamination jig J by moving the lamination head 3 along paths defined by a control program installed in the control unit 5. Since the lamination head 3 includes the fiber width adjustment device 6 for adjusting the width of the prepreg tape T, the prepreg tape T can be laminated while changing the width of the prepreg tape T by controlling the moving mechanism 11 of the fiber width adjustment device 6 with the control unit 5 as long as the width of the prepreg tape T has been specified by the control program.

As a specific example, when the lamination head 3 is moved relative to the table 2 and the lamination jig J while rotating the main body 10 of the fiber width adjustment device 6 by the moving mechanism 11, the prepreg tape T whose width changes continuously according to the rotation angle of the main body 10 can be laminated. Alternatively, when the main body 10 of the fiber width adjustment device 6 is rotated by the moving mechanism 11 until the width of the prepreg tape T reaches a desired width while the lamination of the prepreg tape T is temporarily interrupted and the lamination head 3 is retracted to a disposal area of the prepreg tape T, and subsequently the lamination of the prepreg tape T is resumed, the prepreg tape T whose width changes intermittently can be laminated.

When the adjustment of the widths of the prepreg tapes T using the fiber width adjustment device 6 and the lamination of the prepreg tapes T having the adjusted widths are completed in this way, the laminated body of the prepreg tapes T is obtained. When the FRP to be produced has a complicated shape like an aircraft part having a curved web and flange, it may be necessary to give the laminated body of the prepreg tapes T, placed on the lamination jig J, a shape corresponding to the shape of the FRP. In such a case, following the lamination process of the prepreg tapes T, a shaping process is performed to give the shape to the laminated body of the prepreg tapes T.

The laminated body of the prepreg tapes T can be shaped by heating with a heating device and pressurization. The pressurization can be performed by pressing a shaping mold to the laminated body of the prepreg tapes T with a pressing machine or applying atmospheric pressure to the laminated body of the prepreg tapes T by bagging. When the lamination jig J does not serve as a shaping mold, the laminated body of the prepreg tapes T is transferred from the lamination jig J on a shaping mold. Conversely, when the lamination jig J also serves as a shaping mold, the lamination jig J on which the laminated body of the prepreg tapes T is placed is transported to an area for carrying out the shaping process by bagging, a pressing machine, or the like.

When the shaping of the laminated body of the prepreg tapes T is completed, a preform having a shape corresponding to the shape of the FRP after molding is obtained. Note that, in a case where the FRP has a simple shape like an aircraft panel, and therefore the preform can be produced only by laminating the prepreg tapes T on the lamination jig J having a shape for the shaping, the lamination and the shaping of the prepreg tapes T are performed at the same time.

Once the preform is produced, the resin contained in the prepreg tapes T included in the preform is cured. That is, a curing process of the resin with which the laminated and shaped prepreg tapes T are previously impregnated is performed. Thereby, the FRP having a target shape can be molded.

When the resin is a thermosetting resin, the curing process of the resin is performed by heating the resin using a heating device, such as an oven or an autoclave apparatus. On the other hand, when the resin is a thermoplastic resin, the curing process of the resin is performed by heating and melting the resin once with a heating device, and then cooling the resin by air cooling or the like. In addition, an assembly process for combining the preform with at least one other preform and/or at least one other intermediately cured FRP as well as placing at least one other dry preform to be molded by the RTM method on the preform, and subsequent injection of resin into the at least one dry preform may also be performed prior to curing the resin.

The lamination jig J or the shaping jig may be used as a molding jig for molding the FRP by curing the resin included in the preform. Alternatively, a molding jig may be prepared separately, and the preform may be transferred from the lamination jig J or the shaping jig to the molding jig.

(Effects)

In the above-mentioned fiber width adjustment device 6 and method of molding a composite material, not only the width of the prepreg tape T is adjusted by changing the position where the prepreg tape T leaves the tapered width section 20B having a gradually decreasing width, but also the prepreg tape T is fed out by a plurality of the rollers 21 in the tapered width section 20B. Therefore, according to the fiber width adjustment device 6 and the method of molding a composite material, the prepreg tape T can be fed out without any trouble in the tapered width section 20B.

When a continuous bottom surface is formed in a path whose width gradually narrows, e.g., like the conventional width adjustment device described in Japanese Patent Application Publication JP 2020-093454 A, it is necessary to slide a prepreg tape against the bottom surface. In that case, the resin contained in the prepreg tape may soften due to frictional heat between the bottom surface of the path and the prepreg tape, and thereby the prepreg tape may stick to the bottom surface.

In contrast, the path 20 of the prepreg tape T including the tapered width section 20B of the fiber width adjustment device 6 does not have a continuous bottom surface, and instead the prepreg tape T is fed out by the rollers 21 whose line-contact positions with the prepreg tape T are constantly changed. Accordingly, it is possible to avoid the problem that a prepreg tape sticks to the bottom surface as in the conventional width adjustment device.

In addition, disposing the roller 23, having an appropriately oriented jag and the central groove 24, in front of the tapered width section 20B of the fiber width adjustment device 6 allows folding the prepreg tape T uniformly in the width direction in the tapered width section 20B. As a result, the thickness of the prepreg tape T can be made uniform after adjusting the width of the prepreg tape T.

On the other hand, disposing the pull-out roller 12, for applying pressure to the prepreg tape T, at a position where the prepreg tape T is pulled out from the tapered width section 20B of the fiber width adjustment device 6 allows pressing the prepreg tape T folded in the width direction so that the folded prepreg tape T may not return to the original state. As a result, the width of the prepreg tape T narrowed in the tapered width section 20B can be kept.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, a dry tape which is tape-shaped fibers before being impregnated with resin may be laminated although a case where the prepreg tape T which is tape-shaped fibers after being impregnated with resin is laminated has been described in the above-mentioned implementation. A laminated body of dry tapes produced by laminating the dry tapes and shaping the dry tapes according to a shape of an FRP is called a dry preform.

When an FRP is formed using a dry preform as a material, the FRP is formed by the RTM method. More specifically, a process of impregnating fibers with uncured resin by injecting the uncured resin into the dry preform is performed prior to a process of curing the resin.

What is claimed is:

1. A fiber width adjustment device for adjusting a width of a tape made of fibers before or after being impregnated with resin, the tape being a material for a fiber reinforced plastic, the device comprising:
a pair of wall surfaces forming a path for passing the tape, the path having a gradually decreasing width;
a moving mechanism, including a motor and a rotating shaft rotated by the motor, configured to move the path relatively to the tape so that a position at which the tape leaves the path changes; and
rollers, for feeding the tape, in the path.

2. The fiber width adjustment device according to claim 1, further comprising:
another path, having a constant width, before the path having the gradually decreasing width; and
other rollers for feeding the tape in the another path,
wherein the moving mechanism is configured to rotate the path and the another path while the tape is pulled into the another path from a different position of the another path without rotating the tape.

3. The fiber width adjustment device according to claim 1, further comprising:
a roller disposed before the path, the roller having a surface of which at least a part is jagged in a rotation axis direction, the at least the part of the surface having a shape formed by coupling side surfaces of circular truncated cones in an orientation in which diameters of the side surfaces of the circular truncated cones increase toward a center in the rotation axis direction.

4. The fiber width adjustment device according to claim 1, further comprising:
a roller disposed at the position at which the tape leaves the path, the roller being for changing a feeding direction of the tape in order to feed the tape.

5. A method of molding a composite material comprising:
adjusting the width of the tape using the fiber width adjustment device according to claim 1;
laminating the tape of which the width has been adjusted; and
producing the composite material consisting of the fiber reinforced plastic by curing the resin included in the laminated tape.

6. The fiber width adjustment device according to claim 2, further comprising:
a roller disposed before the path, the roller having a surface of which at least a part is jagged in a rotation axis direction, the at least the part of the surface having a shape formed by coupling side surfaces of circular truncated cones in an orientation in which diameters of the side surfaces of the circular truncated cones increase toward a center in the rotation axis direction.

7. The fiber width adjustment device according to claim 2, further comprising:
a roller disposed at the position at which the tape leaves the path, the roller being for changing a feeding direction of the tape in order to feed the tape.

8. The fiber width adjustment device according to claim 3, further comprising:
another roller disposed at the position at which the tape leaves the path, the another roller being for changing a feeding direction of the tape in order to feed the tape.

9. A method of molding a composite material comprising:
adjusting the width of the tape using the fiber width adjustment device according to claim 2;
laminating the tape of which the width has been adjusted; and
producing the composite material consisting of the fiber reinforced plastic by curing the resin included in the laminated tape.

10. A method of molding a composite material comprising:
adjusting the width of the tape using the fiber width adjustment device according to claim 3;
laminating the tape of which the width has been adjusted; and
producing the composite material consisting of the fiber reinforced plastic by curing the resin included in the laminated tape.

11. A method of molding a composite material comprising:
adjusting the width of the tape using the fiber width adjustment device according to claim 4;
laminating the tape of which the width has been adjusted; and
producing the composite material consisting of the fiber reinforced plastic by curing the resin included in the laminated tape.

12. A method of molding a composite material comprising:
adjusting the width of the tape using the fiber width adjustment device according to claim 6;
laminating the tape of which the width has been adjusted; and
producing the composite material consisting of the fiber reinforced plastic by curing the resin included in the laminated tape.

13. A method of molding a composite material comprising:
adjusting the width of the tape using the fiber width adjustment device according to claim 7;
laminating the tape of which the width has been adjusted; and
producing the composite material consisting of the fiber reinforced plastic by curing the resin included in the laminated tape.

14. A method of molding a composite material comprising:
adjusting the width of the tape using the fiber width adjustment device according to claim 8;
laminating the tape of which the width has been adjusted; and
producing the composite material consisting of the fiber reinforced plastic by curing the resin included in the laminated tape.

\* \* \* \* \*